United States Patent [19]

Yamada et al.

[11] 4,217,337

[45] Aug. 12, 1980

[54] PROCESS FOR MANUFACTURING AN ALUMINA SUBSTRATE BY ACID PURIFYING A PREFIRED SUBSTRATE BEFORE FINAL FIRING

[75] Inventors: Seiichi Yamada; Nobuo Kamehara, both of Machida; Kyohei Murakawa, Yokohama, all of Japan

[73] Assignee: Fujitsu Limited, Japan

[21] Appl. No.: 955,761

[22] Filed: Oct. 30, 1978

[30] Foreign Application Priority Data

Oct. 31, 1977 [JP] Japan ............................... 52/129657

[51] Int. Cl.² .......................... C01F 7/02; C04B 35/44
[52] U.S. Cl. .................................... 423/626; 106/73.4
[58] Field of Search ................ 106/73.4; 423/132, 626

[56] References Cited

U.S. PATENT DOCUMENTS

| | | |
|---|---|---|
| 1,950,883 | 3/1934 | Gitzen ................................. 423/626 |
| 3,854,965 | 12/1974 | Niwa et al. .......................... 106/73.4 |
| 4,045,412 | 8/1977 | Yamada et al. ...................... 106/73.4 |

Primary Examiner—O. R. Vertiz
Assistant Examiner—Mark Bell
Attorney, Agent, or Firm—Staas & Halsey

[57] ABSTRACT

Disclosed is an alumina substrate having a high density, a high degree of surface smoothness and excellent dielectric properties and a process for its manufacture. The process comprises prefiring a green sheet prepared from alumina powder at an elevated temperature, for example between 1200° and 1350° C., to remove combustible substances from the sheet, treating the resultant prefired substrate with an acid aqueous solution to eliminate acid-soluble and decomposable substances from the substrate, and firing the acid-treated substrate at an elevated temperature, for example between 1500° and 1650° C.

17 Claims, No Drawings

PROCESS FOR MANUFACTURING AN ALUMINA SUBSTRATE BY ACID PURIFYING A PREFIRED SUBSTRATE BEFORE FINAL FIRING

FIELD OF THE INVENTION

The present invention is related to an alumina ceramic substrate and more particularly, to a process for manufacturing an alumina substrate having a high density, a high degree of surface smoothness and excellent dielectric properties.

BACKGROUND OF THE INVENTION

Alumina ceramic substrates are widely used as substrates having excellent electrical, mechanical and chemical properties in the microelectronics industry. In addition to these properties, in the case of a substrate for a thin film hybrid integrated circuit, the surface smoothness thereof is one of the important properties. Furthermore, in the case of a substrate for a microwave application, the dielectric of the dielectric constant $\epsilon$ and the dielectric loss tangent tan $\delta$ are important. Therefore, there has been a great demand for an alumina substrate having a high degree of surface smoothness and excellent dielectric properties.

An alumina substrate having the above-mentioned properties may be manufactured by using a fine and highly pure alumina powder, which must be produced by a process other than the known Bayer process, by adding magnesium oxide (MgO) and chromic oxide ($Cr_2O_3$) into the powder, and then sintering the powder (as described in the example in the specification of U.S. Pat. No. 3,854,965). However, the price of this pure alumina powder is ten or more times as high as that of an alumina powder produced by the widely used Bayer process.

The inventors have filed another patent application (which issued as U.S. Pat. No. 4,045,412) disclosing a process for manufacturing an alumina substrate having a high density and a high degree of surface smoothness. The properties are attained by increasing the density of a green sheet formed from alumina powder produced by the Bayer process. The surface smoothness and the sintered density of the alumina substrate manufactured by the proposed process were almost equal to those of an alumina substrate manufactured by the process in the above identified U.S. Pat. No. 3,854,965. However, the proposed process failed to improve the dielectric properties sufficiently. Thus, the dielectric properties of the alumina substrate manufactured by the proposed process were lower than those of the substrate manufactured by the process in the above U.S. Pat. No. 3,854,965.

Thereafter, the inventors continued their study with regard to alumina ceramic substrates and found that the surface smoothness and dielectric properties of a substrate made from the Bayer process alumina powder are influenced by a hydrogen atmosphere condition, e.g. contamination of the atmosphere in a firing process, and by the kinds and quantities of impurities contained in the alumina powder that is used. Even if alumina powders have the same purity, there are generally differences in the kinds and quantities of the impurities contained in the powders.

SUMMARY OF THE INVENTION

It is an object of the invention to provide a process for manufacturing an alumina substrate having a high density, a high degree of surface smoothness and excellent dielectric properties (especially in which tan $\delta$ is small), from an inexpensive alumina powder produced by the Bayer process.

The above-mentioned object has been attained by a process for manufacturing an alumina substrate which comprises the steps of: providing a green sheet from an alumina powder which has been produced by the Bayer process; prefiring said green sheet to provide a prefired substrate; treating said prefired substrate with an acid aqueous solution; and firing (i.e. sintering) said acid-treated substrate.

The process of the present invention will become more apparent from the detailed description and examples which follow.

It is another object of the invention to produce an alumina substrate having high density, a high degree of surface smoothness and excellent dielectric properties with alumina that is not the expensive, high purity variety.

DETAILED DESCRIPTION OF THE PREFERRED EMBODIMENT

The green sheet can be formed by powder-pressing a dry mixture of the alumina powder and a binding agent. The green sheet can also be formed by casting a slip comprising the alumina powder, a binding agent and a plasticizer dispersed in a solvent.

The prefiring operation of the green sheet removes the combustible substances, i.e. the organic material of the binding agent and plasticizer, present in the green sheet. The resultant prefired substrate must have sufficient open pores for the subsequent acid treating and water-washing operations and must have sufficient strength for preventing breakage. The breakage may arise during the acid treating and water-washing operations or during the transferring operations. Such a prefiring operation is carried out at a temperature of from 1200° to 1350° C., and preferably of from 1250° to 1300° C., for a period of from 30 to 180 minutes and preferably of from 60 to 120 minutes, in an air atmosphere.

It is expedient that the acid aqueous solution used for the acid treating operation be a mineral acid, namely, a member selected from the group consisting of hydrochloric acid, sulfuric acid, nitric acid, hydrofluoric acid and phosphoric acid. In view of economic factors and handleability, hydrochloric acid is the most preferable. The concentration of the acid in the acid aqueous solution is at least 1 percent, and preferably from 3 to 10 percent.

Furthermore, if the temperature of the acid aqueous solution is raised, the period of the acid treating operation (i.e. the period for submerging the prefired substrate in the acid aqueous solution) may be reduced, and conversely if the temperature is reduced, the period may become longer. The preferable temperature and period of the acid treating operation are from 60° C. to the boiling temperature of the acid aqueous solution and from 60 to 120 minutes, respectively. However, it should be noted that the acid treating operation may be carried out at a higher temperature and for a longer period than the above mentioned preferable conditions.

The firing operation is carried out at a temperature from 1500° to 1650° C., and preferably from 1550° to 1600° C. When the firing operation is carried out, the firing atmosphere may be composed of air, an impure hydrogen gas or a clean hydrogen gas, but most preferably a clean hydrogen gas.

It is advantageous that the alumina powder used for manufacturing the alumina substrate by the process of the present invention have an average particle size of 1 μm or less and purity of 99.5 percent or more.

The acid treating operation of the prefered substrate results in improving the properties of the alumina substrate manufactured by the process of the present invention. Namely, the tan δ is decreased by approximately one order of magnitude, the surface smoothness is improved in spite of impurities contained in the alumina powder and of contamination of the hydrogen atmosphere, the density is increased, and ε is decreased slightly.

Based on the results of the following experiment, it is believed that the effects caused by acid treating the prefered substrate are obtained by dissolving impurities from the grain boundaries and surface of the alumina into the acid aqueous solution.

EXPERIMENT 0.2 wt% of MgO and 0.03 wt% of $Cr_2O_3$ were added into an available alumina powder (Alcoa A-16) produced by the Bayer process. The powder was mainly composed of α-alumina powder having an average particle size of 0.5 μm and a purity of 99.5%. A green sheet was formed of the powder by a tape casting process and, then, the green sheet was prefired at 1300° C. for 1 hour in an air atmosphere to make a prefired substrate. The prefired substrate (37.9741 g) was boiled in a 5% hydrochloric acid aqueous solution for 2 hours and, thereafter, elements dissolved into the hydrochloric solution were analyzed by atomic absorption spectrometry. The results obtained are shown in Table 1. Also the oxides calculated from each of the dissolved elements and the ratios of each of the oxides to the total oxides are shown in Table 1.

Table 1

| Elements Dissolved from Prefired Substrate into Acid Solution and Oxides thereof | | | | |
|---|---|---|---|---|
| | | | Oxides of the Elements | |
| Dissolved Elements (mg) | | | (mg) | (ratio) |
| Al | 27.50 | $Al_2O_3$ | 51.97 | 0.8485 |
| Ca | 0.45 | CaO | 0.63 | 0.0103 |
| Mg | 4.00 | MgO | 6.63 | 0.1082 |
| Na | 1.25 | $Na_2O$ | 1.68 | 0.0274 |
| Si | 0.16 | $SiO_2$ | 0.34 | 0.0056 |
| Total | 33.36 | Total | 61.25 | 1.0000 |

According to the above results, the total weight of the dissolved impurities (i.e. CaO, MgO, $Na_2O$ and $SiO_2$) is only 0.024% of that of the prefired substrate. However, the ratio of the weight of the impurity oxides to the total dissolved oxides is 15.15%, so that the purity at the grain boundaries and surfaces within the substrate containing the acid must be sharply increased. Therefore, the improvement of the dielectric properties, the surface smoothness and the density of a manufactured substrate, resulting from removing these small amounts of such impurities, is associated with the removal of compounds gathering at the grain boundaries and surfaces of the alumina of the prefired substrate which have harmful influences on these properties.

It is known that β-alumina ($Na_2O.11Al_2O_3$) is a compound which increases the tan δ of an alumina ceramic substrate and that calcium hexaluminate ($CaO.6Al_2O_3$) is an impurity which increases the ε (G. S. Perry, Tran J. Bri. Ceram. Soc. 69 (1974) 177). Assuming the dissolved oxides are present in the experiment in the form of $NaO.11Al_2O_3$, $CaO.6Al_2O_3$, $MgO.Al_2O_3$ (spinel) and $2SiO_2.3Al_2O_3$ (mullite) would require in theory a weight ratio of $Al_2O_3$ of 0.8972, for comparison with Table 1 which shows an actual ratio of $Al_2O_3$ of 0.8485. Since, the difference between these two ratios of $Al_2O_3$ is only about 5 percent it is reasonable to assume that CaO and $Na_2O$ are present at the grain boundary of the prefired substrate as $CaO.6Al_2O_3$ and $Na_2O.11Al_2O_3$ and that these compounds are removed by dissolving so that the tan δ and ε are reduced. Furthermore, these impurities at the grain boundary are removed so that irregular particle growth does not arise during the firing operation, and therefore, the surface smoothness and density of the fired substrate are improved.

The invention will be further clarified by the following Examples 1 through 8.

EXAMPLE 1

0.2 wt% of MgO and 0.03 wt% of $Cr_2O_3$ were added into a Bayer process alumina powder (lot A, Aloca A-16) and were mixed together with the alumina powder in a dry state by a ball mill for 24 hours. A binder system comprised of a binding agent, a plasticizer and solvents, as shown in Table 2, was added into the mixed powder, and then the binder system and the mixed powder were mixed by the ball mill for 120 hours to form a slip. The weight of the added binder system was 50 g per 100 g of the mixed powder.

Table 2

| Composition of Binder System | |
|---|---|
| Component | Weight (g) |
| Polyvinyl butyral | 7.5 |
| Dibutyl phthalate | 10.0 |
| Sorbitan trioleate | 1.0 |
| Methyl ethyl ketone | 54.5 |
| Methyl alcohol | |
| Butyl alcohol | |

The slip was cast on a polyethylene terephthalate film (a Mylar film) by doctor blade to form a green sheet having a thickness of about 0.8 mm. The density of the green sheet was 2.68±0.02 g/cm³ and the surface smoothness thereof was 87±2 gloss (at 60° C.). The green sheet was prefired at 1300° C. for 1 hour in an air atmosphere to make a prefired substrate. The resultant prefired substrate was divided into two pieces.

One piece of the substrate was submerged into a 5% hydrochloric acid aqueous solution, boiled for 2 hours therein, washed with water and then dried. This piece treated with acid and the other piece of the substrate were then fired under the same conditions to make two alumina fired substrates.

With regard to the firing conditions, the firing temperature was 1590° C., the firing period was 1 hour and the firing atmosphere was a clean hydrogen atmosphere (atmosphere A) or an impure atmosphere (atmosphere B). The impure atmosphere was obtained when an $MgO-SiO_2$ type ceramic was simultaneously fired together with the bisected substrates.

The properties of the manufactured alumina substrates are shown in Table 3.

Table 3

| | Properties of the Manufactured Substrate | | | |
|---|---|---|---|---|
| | Acid treatment | | Non treatment | |
| Properties | Atmosphere A | Atmosphere B | Atmosphere B | |
| Density (g/cm$^3$) | 3.99 | 3.99 | 3.97 | 3.98 |
| Surface smoothness* (gloss at 60°) | 72.3 | 66.9 | 68.1 | 56.7 |
| $\epsilon$(25° C. 1MH$_Z$) | 9.9 | 10.0 | 10.0 | 10.7 |
| tan $\delta$(25° C. 1MH$_Z$) | $4.2 \times 10^{-4}$ | $6.5 \times 10^{-4}$ | $1.2 \times 10^{-3}$ | $3.9 \times 10^{-3}$ |

*Measurement is carried out by using a surface glossmeter. (c.f. ASTM D573-67)

As seen from Table 3, all the properties, i.e. the fired density, surface smoothness, $\epsilon$ and tan $\delta$ are improved by the acid treating operation when fired in the clean hydrogen atmosphere, and all but the density improved as a result of the acid treatment.

EXAMPLE 2

Two pieces of a prefired substrate prepared as indicated in Example 1 were fired at 1500° C. for 1 hour in an air atmosphere. The obtained results, i.e. the properties of the manufactured alumina substrates, are shown in Table 4.

Table 4

| | Properties of the Manufactured Substrates | |
|---|---|---|
| Properties | Acid treatment | Non treatment |
| Density (g/cm$^3$) | 3.93 | 3.87 |
| Surface smoothness (gloss at 60°) | 70.1 | 68.6 |
| $\epsilon$(25° C. 1MH$_Z$) | 10.0 | 9.7 |
| tan $\delta$(25° C. 1MH$_Z$) | $5.0 \times 10^{-4}$ | $4.6 \times 10^{-3}$ |

As seen from Table 4, improvements result from the acid treating operation also when the firing operation is carried out in an air atmosphere.

EXAMPLE 3

A green sheet, a prefired substrate and alumina fired substrates were produced under conditions the same as those of Example 1, except for using another lot of alumina powder (lot B, Alcoa A-16). In this example the firing atmosphere was clean hydrogen (atmosphere A). The density of the green sheet was 2.68±0.02 g/cm$^3$ and the surface smoothness thereof was 87±2 gloss (at 60°). Those values were the same as those in Example 1. The results obtained are shown in Table 5.

Table 5

| | Properties of the Manufactured Substrates | |
|---|---|---|
| Properties | Acid treatment | Non treatment |
| Density (g/cm$^3$) | 3.99 | 3.98 |
| Surface smoothness (gloss at 60°) | 76.0 | 56.3 |
| $\epsilon$(25° C. 1MH$_Z$) | 9.8 | 9.9 |
| tan $\delta$(25° C. 1MH$_Z$) | $5.6 \times 10^{-4}$ | $9.7 \times 10^{-3}$ |

Since the quantity of impurities contained in the lot B alumina powder was more than that of the lot A alumina powder in Example 1, in a case where the acid treating operation is not carried out, the surface smoothness and tan $\delta$ of Example 3 are inferior to those of Example 1. However, in spite of the impurities of the lot B of alumina powder, the properties of the alumina fired substrate were also improved by the acid treating operation.

EXAMPLE 4

Prefired substrates prepared as indicated in Example 3 were boiled in hydrochloric acid aqueous solutions having concentrations of 3, 10 and 20%, respectively. Thereafter, these substrates were washed with water, dried and fired at 1590° C. for 1 hour in a clean hydrogen atmosphere to make alumina fired substrates in the same manner as in Example 3. The obtained results, i.e. the properties of each of the manufactured substrates, were almost similar to those of the manufactured substrate which was treated with a 5% hydrochloric acid aqueous solution in Example 3.

EXAMPLE 5

Prefired substrates prepared as indicated in Example 3 were treated with an acid aqueous solution under the following conditions.

Acid solution: 5% hydrochloric acid aqueous solution.

Solution temperature: 40°, 60° and 80° C.

Submerging period 2 hours and 20 minutes.

The substrates were then fired under the same conditions as those in Example 3. The obtained results are shown in Table 6.

Table 6

| | Properties of the Manufactured Substrates | | | |
|---|---|---|---|---|
| Properties | 40° C. 2 hours | 60° C. 2 hours | 80° C. 2 hours | 80° C. 20 minutes |
| Density (g/cm$^3$) | 3.98 | 3.98 | 3.99 | 3.99 |
| Surface smoothness (gloss at 60°) | 60.0 | 65.3 | 71.2 | 68.3 |
| $\epsilon$(25° C. 1MH$_Z$) | 9.9 | 9.9 | 9.8 | 9.8 |
| tan $\delta$(25° C. 1MH$_Z$) | $2.2 \times 10^{-3}$ | $7.2 \times 10^{-4}$ | $5.8 \times 10^{-4}$ | $6.0 \times 10^{-4}$ |

As seen from Table 6, the higher the acid aqueous solution temperature, the stronger the effects of the acid treating operation become. Furthermore, in the case of a solution temperature of 80° C. and more, the acid treating operation for 20 minutes is sufficient for improvement of the properties.

EXAMPLE 6

Prefired substrates prepared as indicated in Example 3 were treated at 80° C. for 1 hour with a 5% nitric acid aqueous solution and a 5% sulfuric acid aqueous solution, respectively. Then the substrates were fired under the same conditions as those in Example 3. The obtained results are shown in Table 7.

Table 7

| | Properties of the Manufactured Substrates | |
|---|---|---|
| Properties | Nitric acid | Sulfuric acid |
| Density (g/cm$^3$) | 3.99 | 3.99 |
| Surface smoothness (gloss at 60°) | 72.3 | 70.8 |
| $\epsilon$(25° C. 1MH$_Z$) | 9.8 | 9.8 |
| tan $\delta$(25° C. 1MH$_Z$) | $5.0 \times 10^{-4}$ | $5.9 \times 10^{-4}$ |

It is evident that the nitric acid and sulfuric acid aqueous solutions have effects similar to those of the hydrochloric acid solution. Furthermore, a mineral acid solution, e.g. hydrofluoric acid solution and phosphoric acid solution, has similar effects to the above-mentioned effects.

EXAMPLE 7

Green sheets prepared as indicated in Example 3 were prefired for 1 hour at 1200°, 1250° and 1350° C., respectively. Then the obtained prefired substrates were treated with a 5% hydrochloric acid aqueous solution at 80° C. for 2 hours and fired at 1590° C. for 1 hour in the atmosphere A (a clean hydrogen atmosphere). The obtained results were almost the same as those of the substrate which was prefired at 1300° C. in Example 3.

EXAMPLE 8

0.2 wt% of MgO as another additive was added into an alumina powder produced by the Bayer process (LS-20 powder made by Nikkeikako Co.,). Then, the additive and the alumina powder were mixed. The mixed powder was compacted in a dry state to form a green sheet. The green sheet was prefired at 1300° C. for 1 hour in air. Then the resultant prefired substrate was bisected. One piece of the substrate was treated with a 5% hydrochloric acid aqueous solution at 80° C. for 2 hours. Then that piece and the other piece of the substrate were fired at 1590° C. for 1 hour in a clean hydrogen atmosphere (atmosphere A) to make alumina fired substrates. The obtained results are shown in Table 8.

Table 8

| Properties of the Manufactured Substrate | | |
|---|---|---|
| Properties | Acid treatment | Non treatment |
| $\epsilon(25°$ C. 1MHz) | 9.8 | 10.1 |
| tan $\delta(25°$ C. 1MHz) | $3.8 \times 10^{-4}$ | $2.6 \times 10^{-3}$ |

Therefore, though the kind of alumina powder and the process for forming a green sheet are changed, the acid treating operation improves the dielectric properties ($\epsilon$ and tan $\delta$).

As is obvious from the above-mentioned examples, submergence of a prefired substrate in an acid aqueous solution (the acid treating operation) improves the density, surface smoothness and dielectric properties of an alumina fired substrate. Furthermore, it is possible to manufacture a high quality alumina fired substrate form an inexpensive alumina powder produced by the Bayer process and to reduce the manufacturing expenses involved in high quality alumina substrate production.

What we claim is:

1. A process for manufacturing an alumina substrate, from alumina powder produced by the Bayer method, said process comprising the steps of:
   providing a green sheet formed from said alumina powder;
   purifying said green sheet of alumina by prefiring said green sheet at a temperature in the range from 1200° to 1350° C. and treating said prefired substrate with an acid aqueous solution; and
   firing said acid-treated substrate.

2. A process as claimed in claim 1, wherein said green sheet is formed by powder-pressing a dry mixture of said alumina powder and a binding agent.

3. A process as claimed in claim 1, wherein said green sheet is formed by casting a slip comprising said alumina powder, a binding agent and a plasticizer dispersed in a solvent.

4. A process as claimed in claim 1, wherein said acid aqueous solution comprises a member selected from the group consisting of hydrochloric acid, sulfuric acid, nitric acid, hydrofluoric acid and phosphoric acid.

5. A process as claimed in claim 1, wherein said acid-treated substrate is washed with water before said firing operation.

6. A process as claimed in claim 1, wherein said acid treating operation is carried out at a temperature of from 60° C. to the boiling temperature of said acid aqueous solution.

7. A process as claimed in claim 1, wherein said firing operation is carried out at a temperature of from 1500° to 1650° C.

8. A process as claimed in claim 1, wherein said firing operation is carried out in an atmosphere chosen from the group consisting of clean hydrogen, impure hydrogen and air.

9. A process as claimed in claim 1, wherein said alumina powder to be formed into said green sheet comprises a binding agent.

10. The process of claim 1, said alumina powder having a purity of at least 99.5%.

11. The process of claim 1, said alumina powder having an average particle size of 1 micron or less.

12. The process of claim 1, said prefiring step comprising prefiring said green sheet for a period between 30 and 180 minutes.

13. The process of claim 1, said prefiring step of said green sheet occurring in an air atmosphere.

14. The process of claim 1, said acid solution comprising at least a 1% solution.

15. The process of claim 1, said acid solution comprising a solution between 3 and 10%.

16. The process of claim 1, said acid treatment occurring for a period between 60 and 120 minutes.

17. A process for manufacturing an alumina substrate, comprising steps of:
   providing a green sheet formed from an alumina powder which has been produced by the Bayer process;
   prefiring said green sheet at a temperature of from 1200° to 1350° C., for a period of from 30 to 180 minutes, in an air atmosphere, to provide a prefired substrate;
   treating said prefired substrate with an at least 1 percent mineral acid aqueous solution, at a temperature of from 60° C. to the boiling temperature of the acid aqueous solution, for a period of from 60 to 120 minutes and
   firing said acid-treated substrate at a temperature of from 1500° to 1650° C.

* * * * *

UNITED STATES PATENT AND TRADEMARK OFFICE
CERTIFICATE OF CORRECTION

PATENT NO. : 4,217,337

DATED : August 12, 1980

INVENTOR(S) : Seiichi Yamada et al.

It is certified that error appears in the above-identified patent and that said Letters Patent are hereby corrected as shown below:

```
Abstract, [57], line 7, "C.," should be --C,--.
Column 2, lines 40, 41, 59, and 66, "C." should be --C--;
Column 2, line 65, after "temperature" insert --of--.
Column 3, line 58, "containing" should be --contacting--.
Column 4, line 8, after "Since" delete ",";
Column 4, line 9, after "percent" insert --,--.
Column 5, Table 3, under heading "Non treatment" the single
          subheading "Atmosphere B" should be two subheadings
          --Atmosphere A-- and --Atmosphere B-- (one above
          each of the two columns);
Column 5, below Table 3, in line beginning "*Measurement is
          carried out...", "D573-67" should be --D573-67)--.
Column 6, line 13, "C." should be --C--.
Column 7, line 10, "C.," should be --C,--;
Column 7, lines 13, 16, 23, 26, 29, and 31, "C." should be
          --C--;
Column 7, line 21, "another" should be --an--;
Column 7, line 22, "an" should be --another--;
Column 7, line 52, "form" should be --from--.
Column 8, lines 1, 20, 53, and 58, "C." should be --C--;
Column 8, line 60, after "minutes" insert --;--.
```

Signed and Sealed this

Third Day of March 1981

[SEAL]

Attest:

RENE D. TEGTMEYER

Attesting Officer

Acting Commissioner of Patents and Trademarks